United States Patent [19]

Starks

[11] 4,033,983

[45] July 5, 1977

[54] NONFLAMMABLE COATING MATERIAL

[75] Inventor: Charles M. Starks, Ponca City, Okla.

[73] Assignee: Continental Oil Company, Ponca City, Okla.

[22] Filed: Dec. 17, 1975

[21] Appl. No.: 641,856

[52] U.S. Cl. .................. 260/33.6 UA; 526/227; 526/278

[51] Int. Cl.² .................................. C08K 5/01

[58] Field of Search ............... 526/278, 227; 260/33.6 UA

[56] References Cited

UNITED STATES PATENTS 3,725,509 4/1973 Kraft et al. .................. 260/899
3,919,458 11/1975 Richardson et al. ......... 260/346.8 R

FOREIGN PATENTS OR APPLICATIONS 2,405,284 8/1974 Germany

*Primary Examiner*—Donald E. Czaja
*Assistant Examiner*—H. H. Fletcher
*Attorney, Agent, or Firm*—Cortlan R. Schupbach, Jr.

[57] ABSTRACT

An improved nonflammable coating composition containing vinyl chloride, dialkyl maleate, and bis (2-chloroethyl) vinyl phosphonate, the improvement comprising forming a tertelomer using a free radical initiator in the presence of xylene, wherein the alkyl constituent of the maleate contains from 3 to 15 carbon atoms and the alkyl constituent of the phosphonate contains from 1 to 15 carbon atoms.

4 Claims, No Drawings

NONFLAMMABLE COATING MATERIAL

The present invention is directed to tertelomers which are prepared from vinyl chloride, dialkyl maleates, and bis (2-chlorethyl) vinyl phosphonates. More specifically, the invention is directed to tertelomers which are prepared using a free radical initiator while in the presence of xylene solvent.

Those skilled in this art will realize it is very difficult to prepare solid, high molecular weight polymers of bis hydrocarbo vinyl phosphonates although such polymers are highly desirable since they are characterized by a high degree of fire retardancy. Many thermoplastic polymers, such as homo and copolymers of methyl methacrylate, polystyrene, acrylonitrile, butadiene-styrene resins, and polyolefins are hard, and in many instances, optically clear. These materials are widely utilized for the preparation of a broad range of articles requiring such clarity. Normally, these thermoplastic polymers will ignite and continue to burn upon exposure to flames and high temperatures. Many applications utilizing these polymers require that they be resistant to prolonged exposure to high temperatures and also require fire or flame retardant properties so that they may meet standards set by various building codes or, alternatively, may be safely employed in the place of more costly materials.

To answer the above-mentioned problems, much work has been done in the area of using polymers prepared from vinyl halides and bishydrocarbo phosphonates as additives to these thermoplastics in order to provide the flame retardant properties.

Among such processes which have been developed are those described in U.S. Pat. No. 3,726,839, which discloses a cross-linked copolymer of a bis (hydrocarbo) vinyl phosphonate, a poly functional ethylenically unsaturated monomer, and optionally one or more monofunctional vinyl comonomers. These cross-linked copolymers are used as flame retardant materials and are also blended with various thermoplastic polymers in order to reduce flammability. Another composition has been the intimate admixture of a thermoplastic polymer with a copolymer of a halogen containing, ethylentically unsaturated monomer and a bishydrocarbo vinyl phosphonate, as described in U.S. Pat. No. 3,725,509. When used as additives, these modified thermoplastic polymers display a high degree of flame retardancy while maintaining basically unchanged thermoplastic polymer properties. Yet another patent which describes the use of these materials is U.S. Pat. No. 3,725,359, which discloses post-chlorinating copolymers of vinyl halide, bishydrocarbo vinyl phosphonates, and optionally an ethylenically unsaturated monomer. The object of the post-chlorinated product is a higher glass transition temperature than the copolymers originally displayed which allows the preparation of polyblend having a significant degree of flame retardancy without heat distortion. However, all of these processes suffer in large extent from a common problem. These copolymers, dissolved in special solvents, form coating materials which have low flammability, higher resistance than most solvents, and low permeability to water vapor. However, as more comonomer is added to vinyl chloride, the product becomes more flammable, more soluble, and more flexible since the vinyl halide imparts the major portion of the flame retardancy. Thus, incorporation of phosphorus into the polymer is desirable since it greatly decreases the flammability of the polymer, especially when chlorine atoms are also present. All this is well-known in the art. However, difficulties are often encountered in preparation of coating materials containing both chlorine and phosphorous, especially so in obtaining products with acceptable solubility in low cost solvents, which will yield clear coherent films on drying. In addition, these polymers, especially when cross-linked, are difficult to handle, and impart processing problems to many of the thermoplastics in which they are used. Even when used alone, these copolymers are extremely difficult to prepare. Processing time is extremely critical before cross-linking occurs to the point at which the composition becomes largely unusable.

It is therefore desirable that a nonflammable, clear coating composition be developed which is easily handled and contains both chlorine and phosphorous and has acceptable solubility in low cost solvents while yielding clear coherent films.

It is therefore an object of the present invention to obtain a nonflammable product containing phosphorous and chlorine, soluble in a low cost solvent, and yielding a coherent, clear coat on drying. Other objects will become apparent to those skilled in this art as the description proceeds.

It has now been discovered in accordance with the present invention that a telomeric, nonflammable coating composition containing a vinyl halide, dialkyl maleate, and a bis (2-chloroethyl) vinyl phosphonate will produce a product which contains phosphorous and chlorine, is soluble in xylene, and which will yield a clear, coherent coating on drying. These coating materials are prepared by the telomerization of vinyl chloride, dialkyl maleate, and bis (2-chloroethyl) vinyl phosphonate in xylene as a solvent while in the presence of suitable free-radical initiators.

Telomerization is carried out in the presence of a chain transfer agent to yield a series of low molecular weight products. Chain transfer agents called telogens are added to the recipe as a molecular weight regulator. In the instant invention, xylene is the most acceptable telogen, although others may be useful. However, solvents such as benzene, toluene, acetone, tetrahydrofuran, cyclohexane, dimethylformamide, dimethyl sulfoxide, and trichloromethylene do not have a chain transfer effect and produce polymers rather than the telomers of the instant invention. Xylene, in addition to acting as a chain transfer agent during the telomerization process, also acts as a solvent for the coating itself. Xylene is acceptable under many environmental standards and can be freely used for most applications. As xylene evaporates from the telomers, a clear coherent film is obtained which provides fire retardancy while maintaining a coherent coating. Other solvents which do not act as chain transfer agents will dissolve the telomers of the instant invention; however, these solvents are not as acceptable as xylene for most purposes due to environmental standards.

While any vinylhalide will be effective in the process of the present invention, for practical purposes, vinylchloride is the only monomer which is acceptable. Chlorine is a known fire retardant, and the vinylchloride is commercially available in large quantities.

Dialkyl maleates useful in the present invention have the structural formula shown in I, wherein R and R$^1$ are the same or different alkyl radicals containing from about 3 to about 15 carbon atoms. Representative of such radicals are butyl, pentyl, octyl, decyl, and pentadecyl. Representative examples such compounds are dibutyl maleate, dipentylmaleate, pentyl butyl maleate, decyl octyl maleate, didecylmaleate, di-isobutyl maleate, di-n-hexyl maleate, di-n-octyl maleate, di-n-decyl maleate, di-n-tetradecyl maleate, di-benzyl maleate, di-cyclohexyl maleate, octyl hexyl maleate, decyl butyl maleate, and mixtures of the compounds.

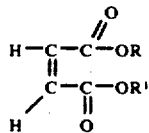

Usually, any bis (hydrocarbo) vinyl phosphonate having the general structure shown in Formula II, can be used,

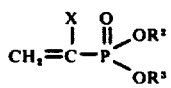

wherein X is selected from the group consisting of hydrogen and halogens, cyano-alkyl groups, alkyls containing 1 to 18 carbon atoms, and haloalkyls containing from 1 to 18 carbon atoms wherein $R^2$ and $R^3$ are the same or different alkyl radicals containing from 1 to 15 carbon atoms. Representative examples of such compounds are bis (beta-chloroethyl) vinyl phosphonate, bis beta chloropropyl vinyl phosphonate, bis-beta-chloroethyl-1-methyl vinyl phosphonate, bis-beta-chlorylethyl-1 phenol vinyl phosphonate, bis-beta chloroethyl-1 chloro vinyl phosphonate, bis-2 chloro isopropyl-1 methyl vinyl phosphonate, di propyl vinyl phosphonate, diisopropyl vinyl phosphonate, bis-2-3 dichloro propyl phosphonate, bis-beta-chloroethyl-1 cyano vinyl phosphonate, and bis-2-chloro-butyl-vinyl phosphonate. Of these, bis-2-chloroethyl vinyl phosphonate is most preferred.

The telomerization is carried out in the presence of a chain initiating agent, such as azobisisobutylnitrile and various peroxides known for this purpose. Among these are benzoyl peroxide, lauryl peroxide, 2,4 dichlorobenzoyl peroxide, p-chlorobenzoyl peroxide, acetyl peroxide, decanoyl peroxide, succinic acid peroxide, t-butyl peracetate, t-butyl perhenzoate, t-butyl hydroperoxide, dicyclohexyl peroxy carbonate, methyl ethyl ketone peroxides, hydroxyheptyl peroxide, di-t butyl hydroperoxide, and t-butyl peroxyisobutyrate.

As has been stated above, the reaction must be carried out in the presence of a chain transfer agent. Most solvents do not have the ability to act as a chain transfer agent in a telomerization reaction. An exception is xylene, which is an acceptable solvent of low cost which will act as a chain transfer agent. The amount of xylene is not critical above a minimum level needed to act as a chain transfer agent. Thus, the viscosity of the telomer, which is not cross-linked, may be adjusted simply by adding additional xylene solvent once the reaction is complete.

The proportions of ingredients in the telomerization, described above, can vary widely; however, the mole proportion of ingredients, based on 1 mole of vinyl chloride, range from about 0.1 to about 1.0 for vinyl chloride; from about 0.05 to about 0.5 for dialkyl phosphonates; and from about 0.25 to about 2.0 for xylene. The amount of the free radical initiator useful in the process of the present invention ranges from about 0.01 mole percent to about 1 mole percent.

The telomerization reaction is normally carried out by mixing vinyl chloride, dialkyl maleate, and bis-2-chloroalkyl vinyl phosphonate along with xylene and a free radical initiator. The reaction is carried out at a temperature ranging from about 25° to about 100° C. Temperature will depend primarily upon the free radical initiator utilized. The reaction is carried out for a period of time ranging from about 2 to about 24 hours. The preferred temperature and time is from about 40° to about 70° C and from about 4 to about 10 hours; however, it will be apparent to those skilled in this art that the reaction time and temperature will depend in a large extent on the amount of xylene and the type of free radical initiator utilized in the process of the present invention.

The invention is more concretely described with reference to the example below, wherein all parts and percentages are by weight unless otherwise specified. The example is designed to illustrate the present invention and should not be construed to limit it.

EXAMPLE 1

Various mixtures of vinyl chloride, dibutyl maleate, bis (2-chloroethyl) vinyl phosphonate, xylene, and benzoyl peroxide were prepared. The mixtures were placed in heavy walled glass bottles, sealed, and placed in an oil bath at 65° to 70° C for 24 hours. At the conclusion of this 24-hour period, the bottles were vented, and the products were removed. The products were spread on various surfaces without further preparation. The surfaces included paper, glass, aluminum, steel, and plaster. Each surface was covered by a clear, flexible, highly adherent film which would not burn when contacted with an open flame. The various proportions tested are shown in Table I.

TABLE I

| Vinyl Chloride (ml) | Dibutyl Maleate (ml) | Bis (2-chloroethyl) Vinyl phosphonate (ml) | xylene (ml) | Benzoyl Peroxide g. | Weight Loss on Ventiry | Product |
|---|---|---|---|---|---|---|
| 55 | 12 | 5 | 50 | 0.3 | 1.8 | Clear visious |
| 55 | 12 | 10 | 50 | 0.3 | 1.5 | Clear oil |
| 55 | 12 | 20 | 50 | 0.3 | 1.4 | Clear |

It will be apparent from the above description that the reaction time for these telomers is not critical. For example, should the reaction go longer than 24 hours in the presence of xylene, the reaction will merely go to completion and no increase in viscosity will occur. Thus, since viscosity will not increase, a manageable product will be obtained. The simplicity of the reaction, requiring no exotic equipment, is an additional advantage.

An additional unexpected benefit has been found when unreacted bis 2-chloroethyl vinyl phosphonate is used and the reaction does not go to completion. This compound is known to be an insect repellent, and any material left unreacted slowly exudes from the coated film and imparts long lasting insect repellency to the coating.

In summary, the instant invention provides a low viscosity, highly manageable, flame retardant, highly adherent, clearly flexible coating hitherto unobtained in the art. The process of preparation is simple. The xylene solvent used is highly acceptable for many applications, whereas many solvents, such as benzene, are prohibited. The material has flame retardancy while maintaining its clarity and adherency to a wide range of objects.

While certain embodiments and details have been shown for the purpose of illustrating this invention, it will be apparent to those skilled in this art that various changes and modifications may be made herein without departing from the spirit or the scope of the invention.

I claim:

1. An improved, nonflammable coating composition containing vinyl chloride, dialkyl maleates, and bis-2-chloro alkyl vinyl phosphonates, the improvement comprising forming a tertelomer using a free radical initiator in the presence of at least, based on one mole of vinyl chloride, 0.25 moles of xylene, and from about 0.01 to 1 moles vinyl phosphonate and 0.05 to 0.5 moles of dialkyl maleate, wherein the maleate is defined by:

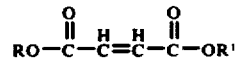

and wherein the phosphonate is defined by:

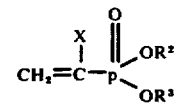

wherein R and R$^1$ are the same or different alkyl radicals containing from 3 to 15 carbon atoms, R$^2$ and R$^3$ are the same or different alkyl radicals containing from 1 to 15 carbon atoms and $x$ is selected from the group consisting of hydrogen, halogens, and alkyls, cyanoalkyls and haloalkyls containing from 1 to 18 carbon atoms.

2. A telomeric coating composition as described in claim 1, wherein the free radical initiator is selected from the group consisting of benzoyl peroxide, lauryl peroxide, 2,4 dichlorobenzoyl peroxide, azobisisobutylnitrile, p-chlorobenzoyl peroxide, t-butyl peracetate, t-butyl perbenzoate, and t-butyl hydroperoxide.

3. A composition as described in claim 1, wherein the dialkyl maleates are selected from the group consisting of di-n-butyl maleate, di-isobutyl maleate, di-n-hexyl maleate, di-n-octyl maleate, di-n-decyl maleate, and mixtures of these.

4. A composition as described in claim 1 when prepared at a reaction temperature of from about 25° to about 100° C for a period of time of from about 2 to about 24 hours.